United States Patent [19]

Watts

[11] Patent Number: 4,837,942

[45] Date of Patent: Jun. 13, 1989

[54] CENTERING PUNCH OR OTHER CENTERING MARKER AND CLIP ASSEMBLY FOR BLIND MARKING OF MOUNTING APERTURES

[76] Inventor: William M. Watts, 813 Second Ave., Joliet, Ill. 60433

[21] Appl. No.: 59,652

[22] Filed: Jun. 8, 1987

[51] Int. Cl.[4] .................................................. G01B 3/02

[52] U.S. Cl. .......................................... 33/666; 33/574; 33/613

[58] Field of Search .................. 33/666, 667, 669, 574, 33/613, 516, 520, 528, 626

[56] References Cited

U.S. PATENT DOCUMENTS

| | | | |
|---|---|---|---|
| 2,675,625 | 4/1954 | Rayl | 33/574 |
| 4,382,337 | 5/1983 | Bendick | 33/613 X |
| 4,527,338 | 7/1985 | Dickinson | 33/669 |

*Primary Examiner*—Harry N. Haroian

[57] ABSTRACT

A device for marking the location of panels, strips, or other decorative objects to the surface of an automobile or other object, comprising a short punch having a pointed tip extending from a short cylindrical body having an annular slot with or without an o-ring or similar material seated therein and a mounting clip having a planar receiving slot with a wide portion corresponding to the outer diameter of the cylindrical body of the punch leading to a narrowed portion corresponding to the diameter bounded by the annular slot whereby said punch is inserted in the wide portion of the clip and slid into the narrowed portion where its held securely. The clips are then inserted into the decorative panel and the panel held up to the abutting surface where force is then applied, thus, marking the surface to which the panel is to be applied.

10 Claims, 1 Drawing Sheet

FIG. 1
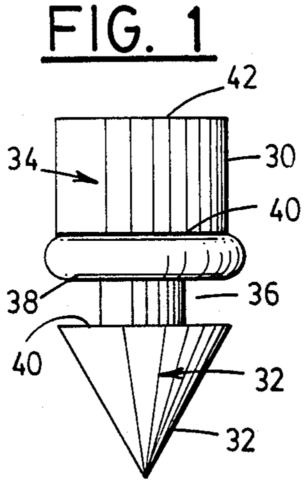
FIG. 2
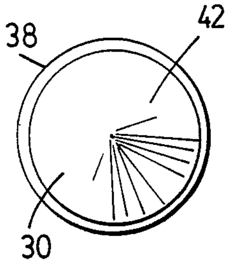
FIG. 3
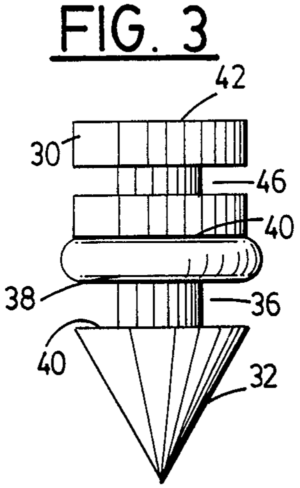
FIG. 13
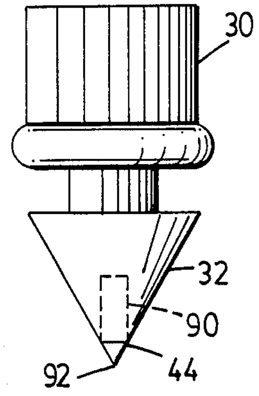
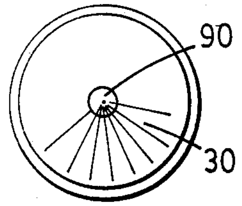
FIG. 14
FIG. 8
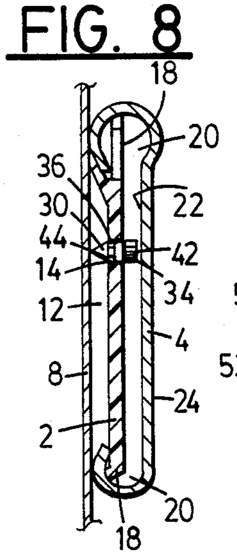
FIG. 15
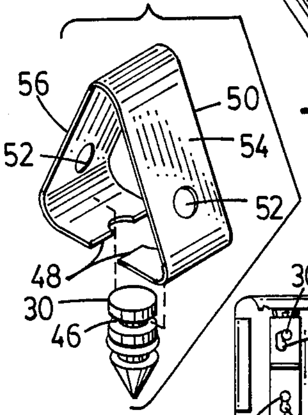
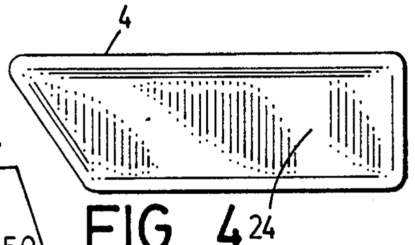
FIG. 4
FIG. 5
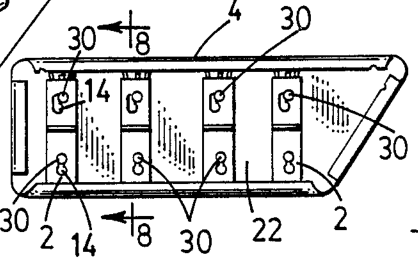
FIG. 9
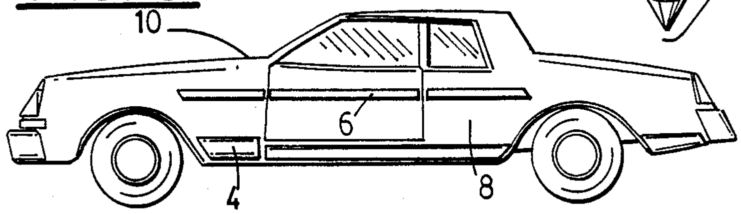
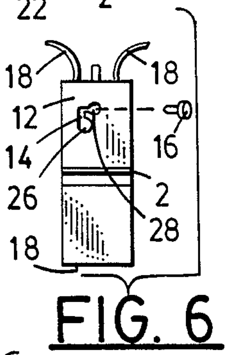
FIG. 6
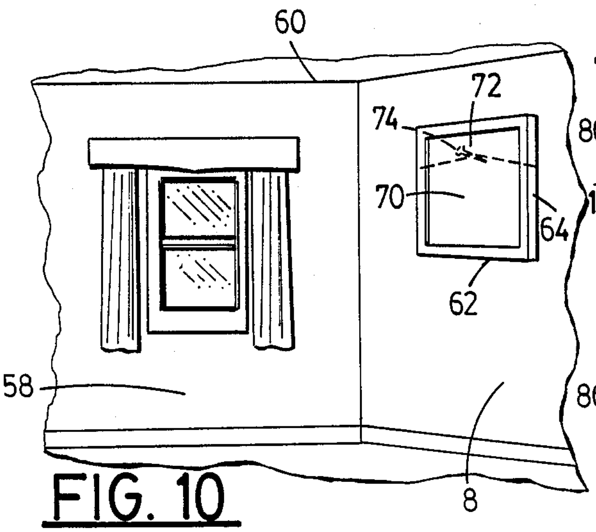
FIG. 10
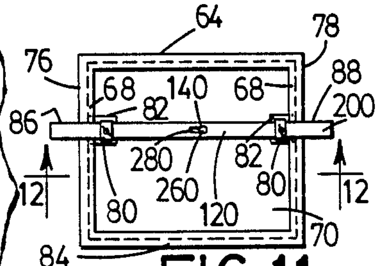
FIG. 11
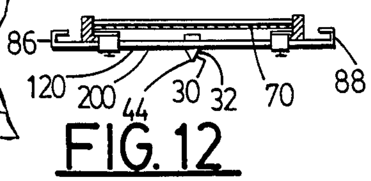
FIG. 12
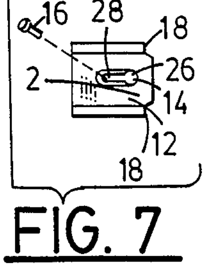
FIG. 7

CENTERING PUNCH OR OTHER CENTERING MARKER AND CLIP ASSEMBLY FOR BLIND MARKING OF MOUNTING APERTURES

BACKGROUND OF THE INVENTION

This invention relates to the field of centering punches and holding devices for blind marking of mounting apertures in which permanent fasteners or hangers will be secured to hold a panel, strip or other item to the wall of an auto body or the like in a specifically pre-selected position and location.

The problem in determining where to place the permanent rivets, or other fasteners, arises from the fact they are behind the panel, strip or other item that is to be mounted so the installer is unable to see exactly where they must be placed in order for the item to be mounted in the exact position and location desired. The present invention solves this problem by providing short center punches having a diameter and length corresponding to that of the rivets, or other fasteners which are going to be used to permanently secure the panel, strip or other item to the wall. Such short center punches have a sharply pointed tip, a short cylindrical body having an annular slot with an O-ring or similar material therein, for being tightly received in the narrowed portion of a receiving slot of a mounting clip which will be secured to the inwardly facing side of the panel, strip or other item that is going to be mounted on the wall of an auto body or other object.

The end of the centering punch which is opposite from the tip end is flat to provide an abutting bearing surface against the inwardly facing side of the panel, strip or other item. The length of the cylindrical body portion of the centering punch, from its annular slot to its bearing surface end is sufficient for the bearing surface end to abut against the inner surface of the panel, strip or other item when the annular slot is snugly received in the narrowed portion of the receiving slot of the mounting clip. This construction makes it possible for the force from striking or pressing the outwardly facing side of the panel, strip or other item to be transmitted to the abutting bearing surface of the centering punch and to its pointed tip for marking the surface of the wall of the auto body at the exact place a rivet or other permanent fastener is to be secured in order to hold the panel, strip or other item in the desired position and location.

With a plurality of spaced apart mounting clips having centering punches in accordance with this invention mounted therein, secured to the inwardly facing side of a panel or strip, such panel or strip can be placed in the exact desired position and location against the wall of an auto body for example, the outwardly facing surface of such panel or strip struck or pressed at each point where a centering punch is located, and the wall of which the panel or strip is to be mounted will be marked as to where a centering punch is located, and the wall on which the panel or strip is to be mounted will be marked as to where each rivet or other permanent fastener is to be placed. The centering punches are then removed from the mounting clips, the mounting clips secured to the rivets and riveted to the wall of the auto body at each place where marked, and the panel or strip then snapped in place on the mounting clips.

The invention includes a gripping tool to seat the centering punches on the receiving slot of the mounting clips and to remove therefrom.

SUMMARY OF THE INVENTION

It is an object of the invention to provide a centering punch or other centering marker for blind marking of positions for fasteners on a mounting surface to secure a mounted object to said mounting surface in an exact pre-selected position and location.

It is an object of the invention to provide a centering punch or other centering marker for blind marking of positions for fasteners on a mounting surface to which another object is to be affixed in a pre-selected place and in a pre-selected position, including holding means to hold said centering punch or other centering marker on the side of said object facing the mounting surface to which it is to be affixed.

It is an object of the invention to provide a plurality of centering punches or other centering markers for blind marking of a plurality of positions for a plurality of fasteners on a mounting surface to which another object is to be affixed in a pre-selected place and in a pre-selected position.

It is an object of the invention to provide a centering punch or other centering marker for blind marking of positions for fasteners on a mounting surface in which such punch or other marker corresponds in size to the fasteners thereby enabling inexpensive mass production.

It is an object of the invention to provide a centering punch or other centering marker for blind marking of positions for fasteners on the wall of an auto body to which protective strips or decorative panels are to be affixed in particular pre-selected places and particular pre-selected positions.

It is an object of the invention to provide a centering punch or other centering marker for blind marking of positions for fasteners on the wall of a room to which pictures are to be hung at particular pre-selected locations.

It is an object of the invention to provide a centering marker for blind marking of positions for fasteners on a mounting surface to secure a mounted objected thereto in a particular place and position wherein said marker is a small centering punch corresponding in size to a fastening rivet, having a short cylindrical body, a conical pointed end extending therefrom, and an annular groove around the cylindrical body to seat in a corresponding receiving slot of a holding clip affixed to the side of said mounted object which faces the mounting surface when secured thereto.

It is an object of the invention to provide a centering marker for blind marking of positions for fasteners on a mounting surface to secure a mounted object thereto in a particular place and position, a holding member to receive and hold said centering marker in position for such marking, and a tool to affix said holding member and to remove it therefrom.

BRIEF DESCRIPTION OF THE DRAWING

FIG. 1 is a side elevation view of a centering punch in accordance with this invention.

FIG. 2 is a top plan view of the centering punch showing in FIG. 1.

FIG. 3 is a side elevation view of a modified centering punch in accordance with this invention in which the punch has two annular grooves.

FIG. 4 is a side elevation view of a decorative panel to be affixed to the wall of an auto body for which centering punches shown in FIGS. 1-3 may be used, showing the outwardly facing side of the decorative panel.

FIG. 5 is a side elevation view of the decorative panel shown in FIG. 4 but showing its inwardly facing side with a plurality of centering punches as shown in FIG. 1 mounted in clips secured to the inwardly facing side of the decorative panel.

FIG. 6 is an elevation view of one of the clips as shown secured to the inwardly facing side of the decorative panel in FIG. 5, and a rivet in line with the narrowed portion of the receiving slot in which it is to be seated for securing the clip to the wall of the auto body at the location marked by the centering punch previously seated therein.

FIG. 7 is an elevation view of one of the clips, and a rivet in line with the narrowed portion of the receiving slot in which it is to be seated for securing the clip to the wall of the auto body at the location marked by a centering punch previously seated therein.

FIG. 8 is a section view taken on line 8—8 of FIG. 5, showing a section of the decorative panel, a mounting clip secured thereto, and of a centering punch as shown in FIG. 1 held in one of the receiving slots of the clip.

FIG. 9 is a side elevation view of an automobile showing a decorative panel as shown in FIG. 4 and three sections of protective strip 6 as shown in FIG. 9 affixed thereto.

FIG. 10 is a perspective view of a room in a building showing a picture on the wall, it's fastening brad and wire shown in phantom by broken lines, for which a centering marker in accordance with this invention locates the pre-selected spot for placement of the fastening brad into the wall.

FIG. 11 is an elevation view of the back side of the picture shown in FIG. 10, with a centering punch holding member adjusted thereto to position the centering punch relative to the picture at the place where the fastening device will be relative to the picture when the fastening device has been placed in or on the wall, the holding member extending outwardly beyond the side edges of the picture frame so pressure can be applied directly to the holding member to press the centering punch against the wall thereby avoiding damage to the picture and frame if pressure were applied directly to them.

FIG. 12 is a section taken on line 12—12 of FIG. 11 with a centering punch shown seated in the receiving slot of the holding member.

FIG. 13 is an elevation view of a modified form of a centering marker in accordance with this invention having a recess in the pointed tip end to receive and hold a stick of pencil lead for marking the location on a mounting surface by such pencil lead instead of by making an indentation, the recess and stick of lead shown in phantom by broken lines.

FIG. 14 is a bottom plan view of a centering marker as shown in FIG. 13 but with the marking substance removed to show the empty recess cavity.

FIG. 15 is a perspective view of a tool to seat and unseat centering markers in accordance with this invention in the receiving slots of the holding clips attached to the item to be mounted on a mounting surface.

DESCRIPTION OF PREFERRED EMBODIMENT

A centering punch and clip assembly in accordance with this invention includes a plurality of mounting clips 2 on which a decorative panel 4 or protective strip 6 may be mounted to secure in place on the wall 8 of an auto or other object 10.

Each mounting clip 2 includes a relatively flat body portion 12, having a receiving slot 14 therein to receive a mounting rivet 16 for securing to the wall 8 of an auto 10 or other object. Each mounting clip 2 also includes projections 18 to seat in corresponding mounting channels 20 along the peripheral edges of the panel 4 for securing the panel 4 to the wall 8 of the auto 10 or other object. The mounting channels 20 open along the inwardly facing surface 22 of the panel 4 which faces the wall 8 when projections 18 of clips 2 are seated in the mounting channels 20 at which time the outwardly facing surface 24 of the panel 4 faces outwardly.

The receiving slot 14 of each clip 2 includes an enlarged portion 26 and a narrowed portion 28.

In order to determine the proper places on wall 8 for the rivets 16 for each clip 2, relatively short centering punches 30 are provided which have a cross-sectional dimension and diameter corresponding to that of the rivets 16 whereby they can seat in the receiving slots 14 of the clips 2. Marking indentations can then be made on the wall 8 by holding the panel 4 with clips 2 and centering punches 30 in place in the desired position and location against the wall 8, then striking or pressing against the outwardly facing surface 24 of panel 4 at each point where a centering punch 30 is mounted in a clip 2.

The centering punches 30 each include a conical sharply pointed tip 32 extending from a short cylindrical body 34 having an annular groove 36 extending around the cylindrical body 34 at its junction with the conical tip 32.

A compressible O-ring 38 of resilient material such as rubber is seated in the annular groove 36.

The diameter of the cylindrical body 34 is less than the corresponding dimension of the enlarged portion 26 of the receiving slot 14 of clip 2 whereby the cylindrical body 34 can be inserted into the enlarged portion 26 with its annular groove 36 in line with the narrowed portion 28 of the receiving slot 14. The inner diameter of the annular groove 36 corresponds in size to the cross-sectional dimension of the narrowed portion 28 of the receiving slot 14, whereby the centering punch 30 seats snugly with its annular groove 36 received in the narrowed portion 38 of slot 14. The compressible O-ring 38 is compressed between the surface of the flat body portion 12 of clip 2 adjacent slot 14 and the side wall 40 of annular groove 36 when the centering punch 30 is seated in the narrowed portion 28 of the slot 14 to provide increased frictional and compressive force to hold the centering punch 30 therein until forcibly removed.

The flat body portion 12 of mounting clip 2 is substantially parallel to and spaced apart a short distance from the inwardly facing surface 22 of panel 4 when the projections 18 of clip 2 are seated in channels 20 along opposite peripheral edges of the panel 4.

The longitudinal dimension of the cylindrical body 34 of centering punch 30 corresponds to the distance the flat body portion 12 of clip 2 is spaced apart from the inwardly facing surface 22 of panel 4 when clip 2 is mounted thereon. The free end of cylindrical body 34 of the centering punch 30 terminates in a flat smooth abutment surface 42 which extends in a plane that is normal to the longitudinal axis of the centering punch 30, and which is in bearing engagement against the inwardly facing surface 22 of panel 4 when the annular groove 36 of centering punch 30 is seated in the narrowed portion 28 of receiving slot 14 of mounting clip 2. Such construction enables a force applied to the outwardly facing surface 24 of panel 4 in the direction toward the wall 8 of an object 10 against which panel 4 is placed, to be transmitted to the abutment surface 42 of centering punch 30, through the body 34 and pointed tip 32 of punch 30 and to the point on wall 8 in registration with the pointed tip 32 and against which pointed tip 32 bears to make a pointed imprint mark when such force is applied to outwardly facing surface 24 of panel 4.

When panel 4 is placed against the wall 8 of an object 10 on which it is to be secured, the flat body portion 12 of mounting clip 2 in place on panel 4 is substantially parallel to and spaced apart a short distance from the wall 8 of the object 10.

The longitudinal dimension of the conical pointed tip 32 of centering punch 30 corresponds to the distance the flat body portion 12 of clip 2 is spaced apart from the wall 8 of the object 10 when panel 4 is placed against the wall 8. The free end of the conical pointed tip 32 terminates in a sharp point 44 which is adjacent the wall 8 of the object 10 when the annular groove 36 of centering punch 30 is seated in the narrowed portion 28 of receiving slot 14 of the mounting clip 2, and panel 4 is placed against the wall 8.

The centering punch 30 may include a second annular groove 46 around the cylindrical body 34, positioned between the first annular groove 36 and the abutment surface 42 thereof. The second annular groove 46 is provided to receive the jaw members 48 of a seating tool 50 to seat the centering punch 30 in the narrowed portion 28 of receiving slot 14 of mounting clip 2. Apertures 52 are provided in the arms 54 and 56 of tool 50 having a cross-sectional dimension sufficient to receive the cylindrical body 34 of centering punch 30 therethrough, for drawing centering punch 30 out of the receiving slot 14 after the desired location has been marked on wall 8 of the object 10.

The wall 8 may be of a room 58 of a building 60 which in such case is the object 10, and the decorative panel 4 to be mounted on the wall 8 may be a picture 62, having a peripheral frame 64 with a peripheral receiving channel 68 opening inwardly to the space bounded by the frame 64 to receive a photograph, painting or other item 70 therein.

A center punch mounting clip 200 for use in marking the location on wall 8 where a fastener 72 such as a brad 74 is to be placed, includes an elongated planar body portion 120 having an elongated dimension sufficient to extend beyond the opposite peripheral edges 76 and 78 of the frame 64 when positioned thereon for use in marking wall 8. A pair of retaining clips 80 are mounted to slide on the elongated body portion 120 having offset blades 82 to seat in respective opposite facing portions of peripheral receiving channel 68 to hold the elongated boy portion 120 in a preselected desired location across the inwardly facing side 84 of frame 64 facing wall 8 on which it is to be mounted.

Receiving slot 140 is provided in the mid region of elongated body portion 120 of the center punch mounting clip 200, with narrowed portion 280 in the center of body portion 120 opening to enlarged portion 260 to receive the cylindrical body 34 of center punch 30 for sliding of its annular groove 36 and reduced diameter portion into the narrowed portion 280 with its conical tip 32 facing toward the wall 8 when the frame 64 is placed there against its desired position. The location of the center punch mounting clip 200 on the back side 84 of frame 64 is adjusted to place the point 44 of conical tip 32 seated in the receiving slot 140 where the fastener 72 will be in relation to the frame 64 when frame 64 is to be hung thereon after fastener 72 has been put in place on wall 8.

Pictures may of course be hung on the wall by a number of different means, such as a wire extending across the back of the picture and a hook placed in the wall on which to hang the wire, an eyelet which is fixed in place on the back of the picture to seat on a corresponding fastener on the wall, and various other means. However, in each case the location of the wall fastener relative to the back of the picture can be determined, and that is where the point 44 of conical tip 32 of centering punch 30 is located by appropriate adjustment of the center punch mounting clip 200 in accordance with this invention.

When point 44 of conical tip 32 of centering punch 30 is properly located on the inwardly facing side 84 of the frame 64, the opposite free ends 86 and 88 of elongated body portion 120 extend outwardly from respective side edges of frame 64. Elongated body portion 120 is preferably rigid whereby pressure against the outwardly extending free ends 86 and 88 in the direction toward wall 8 will be transmitted linearly across body portion 120 to its center and to centering punch 30 mounted there at in receiving slot 140, with its conical tip 32 and point 44 extending therefrom toward wall 8. Thus, the person mounting the picture on the wall can push against the outwardly extending free ends 86 and 88 to correspondingly push point 44 of conical tip 32 into wall 8 sufficiently to mark thereon. It is not necessary in accordance with this invention to apply force to any part of the picture or frame itself in order to make the centering punch 30 indent or otherwise mark the wall 8. Force applied directly to a picture or frame in order to push the centering punch 30 into the wall 8 may cause damage to such picture and frame.

The conical tip 32 may include a recess 90 opening to the point 44 to receive a marking substance such as a length of pencil-thin lead 92 or a length of coloring material and the like, to make a contrasting color mark on wall 8 in lieu of making an indentation type of mark therein.

I claim:

1. A centering marker and holding device assembly for blind marking of positions for fasteners on a mounting surface to secure a mountable object to said mounting surface in an exact pre-selected position and location, comprising said mounting surface and said mountable object, centering marker means to make a mark on said mounting surface, holding means on said mountable object to hold said centering marker means securely in place at a first pre-selected location on said mountable object until forcibly removed therefrom, impact means to transmit pressure applied to said mountable object in the direction toward said mounting surface to said centering marker means to make a mark on said mounting surface at a second pre-selected location on said mounting surface, and fastening means to secure said mountable object to said mounting surface at the place thereon wherein said first and second preselected locations are in registration with each other, wherein said centering marker means includes a punch member having a body portion, a conical portion extending therefrom having a sharply pointed tip at the free end of said portion, said fastening means includes a fastening member having a body portion of corresponding cross-sectional configuration and dimension to that of said body portion of said punch member, wherein said holding means holds said fastening member in place to secure said mountable object to said mounting surface when said centering marker means has been removed therefrom and said fastening member received by said holding means.

2. A centering marker and holding device assembly as set forth in claim 1, wherein said mountable object includes an inwardly facing surface facing toward said mounting surface and an outwardly facing surface facing away from said mounting surface, said impact surface of said punch member bearing against said inwardly facing surface of said mountable object when held thereon by said holding means, said impact means comprising said impact surface of said punch member bearing against said inwardly facing surface of said mountable object whereby pressure applied to said outwardly facing surface thereof in said direction toward said mounting surface is transmitted in turn to said inwardly facing surface thereof and to said impact surface of said punch member in bearing engagement against said inwardly facing surface to thereby make said mark on said mounting surface when said pressure is so applied.

3. A centering marker and holding device assembly as set forth in claim 2, wherein said holding means includes a holding clip member, a receiving slot in said clip member having a narrowed portion opening to an enlarged portion, said clip member including mounting projections for reception in corresponding mounting channels opening along said inwardly facing surface of said mountable object, including said mounting channels of said mountable object opening along said inwardly facing surface thereof, said body portion of said punch member being cylindrical and having an outer diameter smaller than the corresponding dimension of said enlarged portion of said receiving slot of said clip member, said body portion of said punch member including an annular groove formed therein, said annular groove having an inner diameter corresponding in size to the cross sectional dimension of said narrowed portion of said receiving slot of said clip member whereby said body portion of said punch member is insertable into said enlarged portion of said receiving slot of said clip member for alignment of said annular groove of said punch member with said narrowed portion of said receiving slot of said clip member and for snugly seating of said punch member in said narrowed portion of said receiving slot of said clip member.

4. A centering marker and holding device assembly as set forth in claim 3, wherein said clip member includes a planar body portion, said receiving slot being in said planar body portion of said clip member, said planar body portion of said clip member being spaced apart from said inwardly facing surface of said mountable object a distance equal to a first dimension when said clip member is affixed to said mountable object, said body portion of said punch member having a longitudinal dimension between said annular groove thereof and said impact surface thereof substantially equal to said first dimension, whereby said impact surface of said punch member is in substantially abutting impact relationship adjacent said inwardly facing surface of said mountable object when said annular groove of said punch member is received in said narrowed portion of said receiving slot of said clip member.

5. A centering marker and holding device assembly as set forth in claim 4, wherein said planar body portion of said clip member affixed to said mountable object is spaced apart from said mounting surface a distance equal to a second dimension when said mountable object is placed against said mounting surface, said annular groove around said body portion being located at the junction of said body portion and said conical portion of said punch member, said conical portion of said punch member having a longitudinal dimension between said annular groove and said sharply pointed tip at said free end of said conical portion substantially equal to said second dimension, whereby said sharply pointed tip at said free end of said conical portion of said punch member is in substantially abutting impact relationship adjacent said mounting surface when said mountable object is placed against said mounting surface with said annular groove of said punch member seated in said receiving slot of said clip member affixed to said mountable object.

6. A centering marker and holding device assembly as set forth in claim 1, wherein said conical portion may include a hole or cavity in said free end of conical portion for reception of any number of types of marking materials.

7. A centering marker and holding device assembly as set forth in claim 3, wherein said body portion of said punch member includes a second annular groove formed therein, said second annular groove being positioned between impact surface of said body portion and said first mentioned annular groove.

8. A centering marker and holding device assembly as set forth in claim 3, including an O-ring or similar compressible material such as a gasket or the like, but not necessitating the use of one.

9. A centering marker and holding device assembly as set forth in claim 3, wherein said punch member is very small corresponding is size to a rivet, wherein said assembly includes manipulating means to grasp said very small punch member and to seat and unseat said very small punch member in said narrowed portion of said receiving slot of said clip member, said manipulating means comprising a tool member having a pair of jaw members to grasp said annular groove of said punch member and position said annular groove in line for entrance into said narrowed portion of said receiving slot of said clip member.

10. A centering marker and holding device assembly as set forth in claim 9, wherein said tool member includes a pair of arms extending from said jaw member, an aperture in at least one of said arms of said tool member, said aperture having a cross-sectional dimension and configuration sufficiently large to receive said body portion of said punch member therein for engagement of said body portion to slide it relative to said receiving slot in said clip member for aid in seating said punch member in said slot and in removing it from said slot.

* * * * *